United States Patent
Warnery et al.

(10) Patent No.: US 8,574,703 B2
(45) Date of Patent: Nov. 5, 2013

(54) PART POSITIONING AND ASSEMBLY PROCESS FOR CREEP SENSITIVE MATERIAL

(75) Inventors: Stephane Warnery, Rennes (FR); Guy Tremblay, Laval (FR)

(73) Assignee: Mann + Hummel GmbH, Ludwigsburg (GB)

( * ) Notice: Subject to any disclaimer, the term of this patent is extended or adjusted under 35 U.S.C. 154(b) by 440 days.

(21) Appl. No.: 12/816,682

(22) Filed: Jun. 16, 2010

(65) Prior Publication Data

US 2010/0316840 A1 Dec. 16, 2010

(30) Foreign Application Priority Data

Jun. 16, 2009 (FR) ..................... 09 54001

(51) Int. Cl.
  *B32B 3/24* (2006.01)
  *F16B 43/00* (2006.01)
  *F16B 43/02* (2006.01)
  *F16B 31/02* (2006.01)

(52) U.S. Cl.
  USPC .......... 428/137; 428/101; 428/105; 428/120; 428/136; 428/139; 428/223; 411/546; 411/900; 411/901; 411/902; 411/903; 411/999; 29/730; 264/265; 264/271.1; 264/273; 264/275; 264/277; 264/278; 264/279

(58) Field of Classification Search
  None
  See application file for complete search history.

(56) References Cited

U.S. PATENT DOCUMENTS

| | | | | |
|---|---|---|---|---|
| 2,733,786 A * | 2/1956 | Drake | ............................. | 52/633 |
| 2,746,780 A * | 5/1956 | Comino | .......................... | 52/846 |
| 2,990,920 A * | 7/1961 | Hoffman, Jr. | .................. | 52/633 |
| 3,127,961 A * | 4/1964 | Frazier | ............................. | 52/633 |
| 3,147,963 A * | 9/1964 | Frazier | ............................. | 267/30 |
| 6,099,975 A | 8/2000 | Peterson | | |
| 6,161,840 A * | 12/2000 | Boardman et al. | ............ | 277/596 |
| 6,420,652 B1 | 7/2002 | Byczek | | |
| 2005/0229514 A1 * | 10/2005 | Nakao et al. | ................. | 52/288.1 |
| 2007/0001484 A1 * | 1/2007 | Okamoto et al. | ........ | 296/193.05 |
| 2007/0262486 A1 | 11/2007 | Waters et al. | | |
| 2008/0157483 A1 * | 7/2008 | Booher et al. | ................ | 277/593 |

FOREIGN PATENT DOCUMENTS

| | | | | |
|---|---|---|---|---|
| DE | 594781 C | * | 3/1934 | ............. A63H 33/12 |
| DE | 1034833 B | * | 7/1958 | ............. A47B 96/14 |
| DE | 10227237 A1 | | 1/2004 | |

(Continued)

OTHER PUBLICATIONS

Machine Translation of FR 2718801 A1, Oct. 1995.*

(Continued)

*Primary Examiner* — David Sample
*Assistant Examiner* — Jeff Vonch
(74) *Attorney, Agent, or Firm* — James Hasselbeck

(57) ABSTRACT

Disclosed is a method and apparatus for positioning and assembly of two or more parts wherein at least one of which is of a creep sensitive material. The method and apparatus enable very precise positioning of parts during assembly by holding a rough alignment with free play permitting finer alignment. Creep resistant annular inserts are molded into the part and provided with flow apertures to conduct plastic material into the annular insert bore. A spindle defined the geometry of a centering hole within the bore during molding. The annular inserts are operable as compression limiters to prevent deformation of the creep sensitive material under the action of heat or tightening stresses.

11 Claims, 2 Drawing Sheets

(56) References Cited

FOREIGN PATENT DOCUMENTS

| | | | | | |
|---|---|---|---|---|---|
| FR | 1110138 | A | * | 2/1956 | ............. A47B 96/14 |
| FR | 2718801 | A1 | * | 10/1995 | ............. F16B 35/06 |
| GB | 933600 | A | * | 8/1963 | ............. A47B 96/14 |
| GB | 935820 | A | * | 9/1963 | ............. A47B 13/06 |

OTHER PUBLICATIONS

Dominik Rosato, Injection Molding handbook—French patent office cite. French patent search of foreign priority application FR 09 54 001.

DPMA Office Action DE 10 2010 023 930.5-16.

* cited by examiner

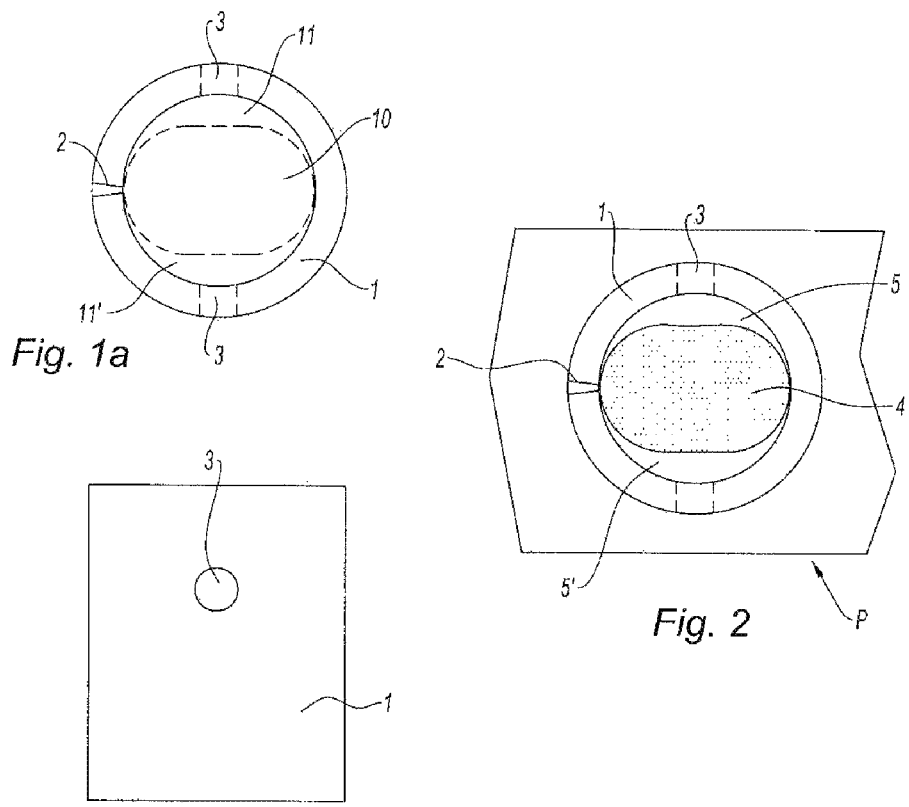
Fig. 1a
Fig. 1b
Fig. 2
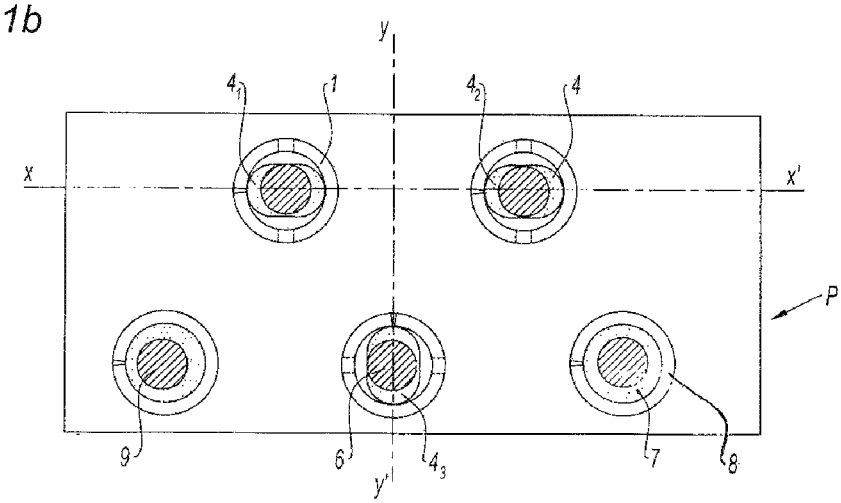
Fig. 3

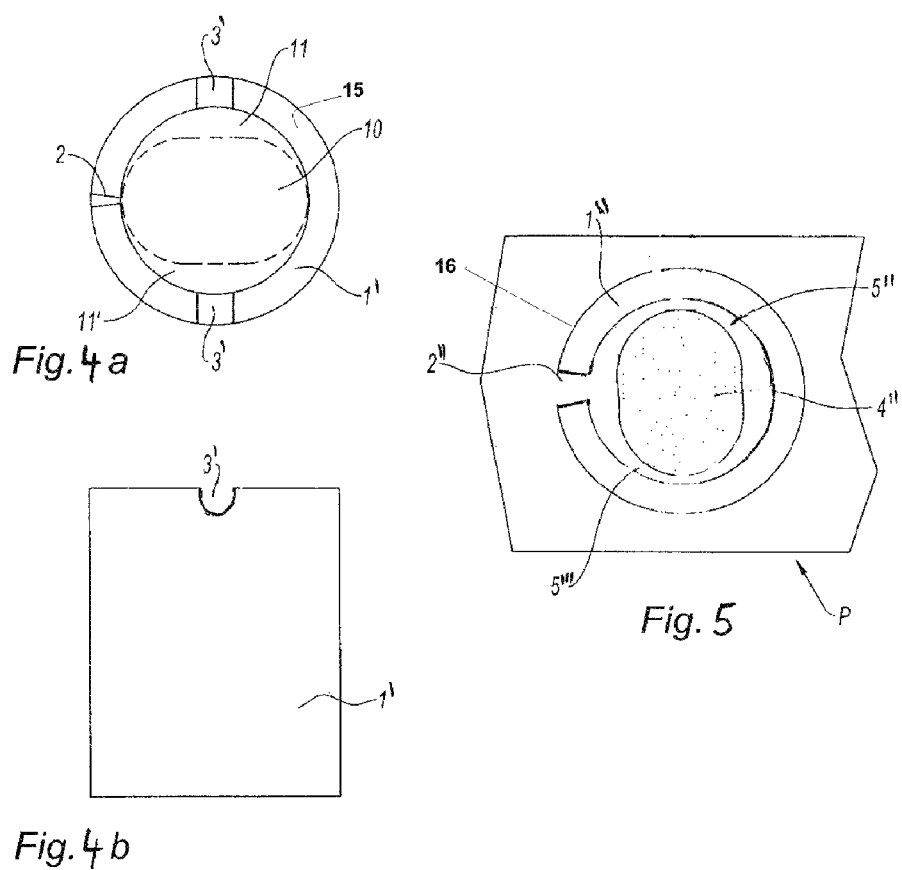

PART POSITIONING AND ASSEMBLY PROCESS FOR CREEP SENSITIVE MATERIAL

CROSS REFERENCE TO RELATED APPLICATIONS

This application claims the benefit under 35 USC 119 of foreign patent application 09 54 001 filed in France on Jun. 16, 2009, and which is hereby incorporated by reference in its entirety.

TECHNICAL FIELD

The subject of the present invention is a positioning and assembly process for two or more parts, in which in this procedure the parts are aligned and then joined. A first of these parts is made of a creep sensitive material such as for example a thermoplastic, a thermosetting material or an elastomer and it is made by a molding process, especially plastic injection molding. As for the second part, it can be made of any material whatsoever, plastic, composite, metal, etc.

BACKGROUND OF THE INVENTION

Filters in many technical domains (automobile industry, household appliances, computer hardware, etc.), parts, especially plastic injection molded parts must be very precisely positioned relative to each other before their assembly using screws or pins for assembly.

Such prior positioning is for example often necessary in the automobile industry, especially for mounting of closure plates, air intake collectors, cylinder head covers or other parts under the hood of automobiles.

In particular with air intake manifolds or other under the hood components, an improper alignment of the air ducts at the connecting flange on the engine can result in reduced air flow, increased pressure drop as well as possible improper sealing and seal leakage at the connection between the air intake manifold and the cylinder head of the internal combustion engine.

Conventionally such positioning is done by means of centering posts or guide pins which are molded on one of the parts to be assembled and placed into corresponding centering holes, either through holes or not, formed in the other part. The assembly of the two parts is then done by means of screws or pins placed into the associated holes.

In the common case of parts made from creep sensitive material, these centering holes are conventionally equipped with spacers which serve the purpose of limiting compression in order to reduce the deformation of the part by creep under the action of temperature and guarantee the firm clamping of the assembled parts over time.

In the prior art, spacer elements or compression limiters are usually pressed into mounting holes in the creep sensitive material part after the part is manufactured or molded.

Such a positioning system has the disadvantage of creating fragile zones or weak points in the parts to be assembled (posts or pins) and also require the addition of supplemental elements such as centering holes which thereby increase the complexity and cost of the parts.

To remedy this disadvantage, it has already been proposed to replace the centering system using posts with a system using positioning screws placed into corresponding holes of each of the parts to be positioned and assembled. The implementation of such screws acting as centering posts has not however turned out to be satisfactory for use to the extent where they do not make it possible to obtain a sufficiently precise positioning.

Using attachment screws engaging with oblong compression limiters has also been proposed, but that leads to significant extra costs while also increasing the implementation complexity.

The use of oblong or oval compression limiters with a larger diameter and a traversing smaller diameter to the axis of the screw are seen as complex in production of creep sensitive parts as such compression limiters are difficult to handle when pressing them into the preformed receiving holes in the part. Due to tolerance variations in the compression limiters and parts, the danger exists that the compression limiters may separate from the part during transport or handling. Additional problems arise as the process of pressing the compression limiters into the receiving holes of the part may generate splinters or otherwise damage the receiving hole, resulting in a damaged part or a less than desired press fit.

Additional problems are from the use of both oblong and cylindrical compression limiters in the same parts these differing compression limiter geometries can be intermixed and thereby inserted into a receiving hole having geometry different from the compression limiter being inserted, resulting in damage to the part or a manufacturing defect.

SUMMARY OF THE INVENTION

An object of the present invention is to provide a positioning and assembly method and apparatus for two parts at least one of which is molded from a creep sensitive material, such as to remedy these disadvantages, in particular to make it possible to obtain very precise advanced positioning of the parts to be assembled while avoiding any deformation of the material constituting these parts under the action of heat or tightening stresses.

According to aspects of the invention, the first step of this process consists of equipping the mold intended for molding of one of the parts, or first part, from a creep sensitive material with at least one spindle so as to obtain, after unmolding, at least one centering hole of corresponding section.

The second step of the process conforming to the invention consists of fitting on the spindle an annular insert made of a material essentially unaffected by creep, in particular of metal, and having an inner diameter different from the section of the spindle and sufficient for defining an intermediate volume around this spindle.

This insert is fixed in the mold so as to be able to be overmolded by creep sensitive material in the first part during the molding process thereof. The insert can be at the spindle or directly held by the mold.

According to the invention, the annular insert is additionally equipped with at least one through orifice which opens into the intermediate volume located around the spindle.

The following step in the process conforming to the invention corresponds to the molding of the first part in the mold thus equipped.

During this molding, the creep sensitive material, in particular the plastic enters the through orifice and fills the intermediate volume included between the spindle and the annular insert.

The following step of the process conforming to the invention corresponds to the unmolding of the first part which is thus equipped with at least one centering hole surrounded by the annular insert inserted in the creep sensitive material, in particular in the plastic.

This insert constitutes a compression limiter which is configured to prevent the effects of plastic creep phenomena in the material surrounding the centering hole upon connection of the two parts.

The following step of the process conforming to the invention corresponds to the positioning of this part relative to the second part by the means of attachment elements (screw, pin, etc.) at least one of which is associated with the centering hole in the first part.

According to the invention, this positioning is done by inserting a screw or pin acting as a centering post into the mounting hole(s) of the second part and into the centering hole of the first part.

The two parts thus positioned relative to each other can next be assembled in a well-known manner by means of placing screws in the associated assembly holes.

Considering the preceding, the process conforming to the invention makes it possible to advantageously use annular inserts which serve as compression limiters and assembly screws or pins for very precisely positioning of the parts to be assembled relative to each other.

According to a particularly advantageous feature of the invention, the spindle making it possible to obtain the centering hole has a noncircular section, preferably an oblong section, in which case the intermediate volume located between this spindle and the annular insert is subdivided into two diametrically opposite parts.

Conforming to this feature, the annular insert is equipped with at least two through orifices, preferably diametrically opposed opening into respectively one of the parts of the intermediate volume.

According to another preferred feature of the invention, the mold intended for the molding of the first part is equipped with at least three oblong spindles distributed thereon. This feature makes it possible to optimize the positioning of the two parts relative to each other in every direction.

In accordance with a further advantageous feature of the invention, the annular insert exhibits a slot formed in the wall of the insert in longitudinal direction, through which the creep sensitive material penetrates into the gap during molding. This slot is, for example, formed by a gap or distance between the two opposite ends of the rolled metal strip which is rolled to form the annular insert. The spindle is smaller in its larger diameter than the inside diameter of the annular insert so that the molded creep sensitive material can flow around the spindle during molding of the part and fill the gap between the spindle and the inner wall of the annular insert.

In a preferred embodiment the annular insert and the spindle are held in the injection molding tool or mold, whereby the annular insert exhibits a circumferential gap between the annular insert and the spindle.

In the optimum case in which the spindles have an oblong section, the larger diameter of two of the spindles can advantageously be aligned along a first axis, whereas the larger diameter of the third spindle is perpendicular to this first axis and centered on the part as best as possible. Such a configuration makes it possible to obtain an optimum positioning of the two parts relative to each other prior to their assembly.

In an alternative embodiment the mold intended for molding the first part is equipped with two oblong spindles, which are arranged over this mold, whereby the longitudinal axis aligned with the larger diameter of each oblong spindle differs from the similar longitudinal axis of the other spindle by substantially 90 degrees.

In a further advantageous embodiment, the mold intended for pouring the first part includes at least one cylindrical spindle and at least one oblong spindle and, which are distributed over this mold, whereby over the spindles one annular insert each is pushed, whereby the size, shape and geometry of the annular inserts used on the cylindrical spindles and oblong spindles are substantially the same so that only one type of annular insert is required.

It should be noted that according to a non-limiting feature of the invention, the annular insert can advantageously be constituted by a band, in particular a slit rolled metal band.

In alternative embodiments, the annular insert may be realized from cut sections of tubular pipe, or in other embodiments may be realized by molding a creep insensitive material (example, ceramic) to form the annular insert.

It is further noted that by "oblong spindles" we are not limiting the geometry of the spindle to a spindle with an elliptical or rectangular cross section but rather we intend to also allow the use of other spindle shapes. Specifically, by "oblong spindle" we mean a spindle that may have differing outside diameters when measured at different angles relative to the elongation axis of the spindle.

A method of positioning and assembling two parts is disclosed in which at least one parts to be joined and assembled is of a creep sensitive material. The method includes Providing a mold equipped for molding a first part, the mold equipped with at least one spindle configured to define a centering hole in the first part during molding.

Providing an annular insert sized to be received over the spindle. The annular insert is made of material unaffected by creep. The annular insert has an inner bore with geometry different from geometry of the spindle. The annular insert includes a wall passage formed by any of: at least one through orifice, at least one recess formed in an end face of the insert, or a slot. The wall passage extends from an outer surface of the annular insert into the bore and is configured to conduct plastic material into the bore during molding of the first part.

Fitting the annular insert onto the spindle of the mold, wherein the difference in geometry defines an intermediate volume void between the spindle and the annular insert, wherein the wall passage opens into the bore at the intermediate volume.

Molding the creep sensitive material into the mold forming the first part. The molding step includes flowing a portion of the creep sensitive material through the wall passage to fill the intermediate volume between the spindle and the annular insert.

Unmolding the first part from the mold and the spindle. The annular insert remains secured to the first part and the spindle leaves a centering hole extending axially through the annular insert defined by the plastic fill in the intermediate volume.

Providing a second part having mounting holes configured to be alignable with the centering holes of the first part.

Providing at least one centering screw or a pin, the centering screw or pin sized for insertion into the centering hole. The centering hole has geometry permitting free play between the centering screw or pin and the centering hole in a first direction taken normal to an axis of the centering hole to permit repositioning of the first part relative to the second part.

Arranging the first and second parts with the mounting holes and centering holes positioned for rough alignment. By rough alignment herein we mean rough alignment in which one of the centering screws or pins is insertable through one of the centering holes into a corresponding one of the mounting holes.

Positioning the first part relative to the second part by inserting the centering screw or pin though the centering hole into the mount hole. The centering screw or pin is operative as a centering post for alignment of the parts. The free play between the screw or pin and the centering hole is operable to maintain rough alignment of the parts while the free play permits relative repositioning of the parts for fine alignment between the first and second parts during assembly.

Securing the first and second parts together by screws.

In another aspect of the invention, the annular insert has an axial length selected to enable the annular insert to function as a compression limiter for the first part.

In another aspect of the invention, the annular insert material is metal, preferably a rolled strip of creep resistant metal.

In another aspect of the invention, the spindle has an oblong cross section, the oblong cross section having a larger diameter axis and a traversing shorter diameter axis. The centering hole in the annular insert has a corresponding oblong cross section.

In another aspect of the invention, the mold is equipped with several spindles. A first portion of the oblong centering holes has a first larger diameter axis aligned perpendicularly to a larger diameter axis of a second portion of the oblong centering holes. Positioning includes beginning positioning of the first part relative to the second part by inserting one of the centering screws or pins though the oblong centering hole into the mount hole, the centering screw or pin operative as a centering post for alignment of the part, then continuing positioning of the first part relative to the second part by inserting additional centering screws or pins though oblong centering holes into corresponding mount holes.

In another aspect of the invention, opposing ends of the rolled metal band forms sidewalls of a slot in the annular insert, the slot formed by a gap between rolled ends of the metal band.

Also disclosed is an assembly of at least two parts wherein the assembly is positioned and assembled according to the above methods. The assembly includes a first part made of a creep sensitive material. At least one annular insert is provided having a bore and at least wall passage formed by any of: at least one orifice, at least one recess formed in an end face of the insert, or a slot. The wall passage is configured to conduct plastic material into the bore during molding of the first part. The wall passage extends from an outer circumferential surface of the annular insert into the bore. The annular insert extends through an opening in the first part and has a length selected such that the annular insert is operable as a compression limiter to conduct compressive forces around the creep sensitive material of the first part. The annular insert is molded with the first part and opens at opposing sides of the first part. Plastic material flowing into the annular insert bore forms at least one crescent shaped plastic segment secured to inner wall of the annular insert. The at least one crescent shaped segment defines an axially extending oblong centering hole extending between opposing axial ends of the annular insert. The centering hole has an oblong cross section. A second part is configured to position and assemble with the first part. The second part includes at least one mounting hole with the mounting hole aligned with a respective one of the at least one centering hole.

In another aspect of the invention, the first part includes at least one annular insert compression limiter having a circular bore sized top receive a mounting screw therethough, the bore having a sufficient diameter to provide free play between the bore and screw. The at least one annular insert with the oblong bore has a same external shape and size as the at least one annular insert with the circular bore.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

FIG. 1a is a top view of one embodiment of an annular insert, consist with the present invention;

FIG. 1b is a side view of the annular insert of FIG. 1a, consistent with the present invention;

FIG. 2 depicts a centering hole surrounded by an annular insert inserted in the material constituting a part made by implementing the process conforming to the invention;

FIG. 3 depicts a part equipped to practice the part alignment and assembly process, consistent with a least one aspect of the present invention;

FIG. 4a is a top view of another embodiment of an annular insert, consistent with the present invention;

FIG. 4b is a side view of the annular insert of FIG. 4a, consistent with the present invention; and FIG. 5 depicts another embodiment of the centering hole surrounded by the annular insert of FIG. 4a inserted into the material constituting a part made by implementing the process conforming to the invention.

It should be noted that the Figures refer to a first part made of plastic and equipped with oblong shaped centering holes.

Skilled artisans will appreciate that elements in the Figures are illustrated for simplicity and clarity and have not necessarily been drawn to scale. For example, the dimensions of some of the elements in the Figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of apparatus components methods related to a part positioning and alignment process and apparatus for creep sensitive materials, for example plastics. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

According to the Figures, the essential step of the process conforming to the invention consists of fitting an annular insert 1 around a spindle with an oblong section 10, shown dotted in FIG. 1a, equipping the mold for injection molding of a plastic part P needing to next be positioned and assembled to another part and then attaching this annular insert 1 to this mold.

The diameter of the annular insert 1 corresponds to the largest diameter of the section of the oblong spindle 10. Subsequently, the oblong spindle 10 and the annular insert 1 delimit between them an intermediate volume which is subdivided into diametrically opposite parts 11, 11'.

According to FIGS. 1a and 1b, the annular insert 1 is made up of a rolled metal band comprising a slit 2 which is equipped with two through orifices 3 each opening into one of the parts 11, 11' of the annular volume delimited around the oblong spindle 10. During injection molding of the part P, the plastic infiltrates into through orifices 3 for filling the parts 11, 11' of the intermediate volume separating the pin 10 and the insert 1.

According to FIG. 2, after unmolding, the part P is thus equipped with an oblong centering hole 4 having a geometry similar to that of the spindle 10 which is surrounded by two crescent shaped plastic segments 5, 5' which correspond to the parts 11, 11' of the intermediate volume delimited in the mold by the spindle 10 and the annular insert 1.

These crescent shaped segments 5, 5' are themselves surrounded by the annular insert 1 which is inserted in the plastic and which constitutes a pressure limiter.

According to FIG. 3, the part P is equipped with three uniformly spaced oblong centering holes 4. The larger diameters of two of these centering holes 41, 42 are aligned on a first axis x, x' whereas the larger diameter of the third centering hole 43 coincides with an axis y, y' perpendicular to the first axis x, x'.

According to FIG. 3, the screws 6 enabling the positioning of the part P relative to the other part, not shown, are inserted in the centering holes 4. The assembly of these two parts is achieved with the screws 6 inserted in the circular section assembly holes 7 surrounded by the annular insert 8 which again serve as compression limiters there.

It should be noted that the screws 6 and 9 may be the same type and both serve for the assembly of the two parts.

A use of different screws 6 and 9 can be favorable in other embodiments or executions of the invention.

The screws 6 simultaneously perform assembly and positioning functions as they have free play within the oblong centering hole of the annular inserts In accordance with the FIGS. 4a and 4b, an alternative form of the annular insert 1' is provided with recesses 3' formed in the circumferential end face 15 of the annular insert 1'. Each recess opens into one of the parts 11, 11' of the annular volume delimited around the oblong spindle 10. During injection molding of the part P, the creep sensitive material infiltrates into through recesses 3' for filling the parts 11, 11' of the intermediate volume separating the pin 10 and the insert 1'.

According to FIG. 5, after unmolding, the part P is thus equipped with an oblong centering hole 4" having a geometry similar to that of the spindle 10 within the annular insert 1" which is surrounded by two crescent shaped plastic segments 5", 5''' which corresponds to the parts 11, 11' of the intermediate volume delimited in the mold by the spindle 10 and the annular insert 1' of FIGS. 4a and 4b.

A description of an alternate embodiment follows with continued reference to FIG. 5. Alternately, during the injection molding process the plastic may infiltrate the through the gap or slot 2" in the wall 16 of the formed annular insert 1" to fill the parts 5", 5''' of the intermediate volume separating the pin 10 and the insert 1". In this alternate embodiment, the annular insert of FIGS. 4a and 4b may be provided without the recesses 3' or the orifices 3 of FIGS. 1a and 1b. As shown in FIG. 5 the two crescent shaped plastic segments 5", 5''' are filled by plastic infiltrating through the slot 2" during injection molding and filling the parts 5", 5''' of the intermediate volume separating the pin 10 and the insert 1". After molding, the part is unmolded from the mold, removing spindle 10 and leaving the oblong centering hole 4" having geometry similar to that of the spindle 10 in which the annular insert 1" and the crescent shaped parts 5" and 5''' form a compression limiter molded into the part P.

In the foregoing specification, specific embodiments of the present invention have been described. However, one of ordinary skill in the art appreciates that various modifications and changes can be made without departing from the scope of the present invention as set forth in the claims below. Accordingly, the specification and Figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. A method of positioning and assembling two parts wherein at least one part is of a creep sensitive material, said method comprising:
providing a mold equipped for molding a first part, said mold equipped with at least one spindle configured to define at least one centering hole in said first part during molding;
providing at least one annular insert sized to be received over a corresponding one of said at least one spindle, said at least one annular insert comprising material unaffected by creep, said at least one annular insert having a circumferential wall including an outer circumferential surface and an inner bore with geometry different from geometry of a corresponding one of at least one spindle, said at least one annular insert including:
two wall passages extending through said wall from the outer circumferential surface to the inner bore, wherein said two wall passages arranged on diametrically opposing sides of a circumferential wall of said annular insert, said two wall passages are any of:
at least one through orifice,
at least one recess formed in an end face of said insert, or a slot;
fitting said at least one annular insert onto said corresponding one of at least one spindle of said mold, wherein said difference in geometry defines an intermediate volume void between said at least one annular insert and said corresponding one of at least one spindle, wherein said two wall passages open into said bore at said intermediate volume;

molding said creep sensitive material into said mold forming said first part, said molding step including flowing a portion of said creep sensitive material through said two wall passages to fill said intermediate volume between said at least one annular insert and said corresponding one of at least one spindle forming diametrically opposing first and second crescent shaped segments within said bore, said diametrically opposing first and second crescent shaped segments both secured to the inner wall of said at least one annular insert and extending axially within said inner bore between opposing axial ends of said at least one annular insert, wherein the first crescent segment is connected to and formed by molded plastic creep sensitive material extending through a first one of said two wall passages and the second crescent shaped segment is connected to and formed by molded plastic creep sensitive material extending through a second one of said two wall passages;

wherein diametrically opposing first and second crescent shaped segments form opposing sides of said at least one centering hole axially extending between said opposing axial ends of said annular insert, said at least one centering hole having a radially oblong cross section;

unmolding said first part from said mold and said at least one spindle, wherein said at least one annular insert remains secured to said first part, wherein said at least one annular insert extends through a corresponding one of at least one opening in said first part and having an axial length selected that said at least one annular insert is operable as a compression limiter and opens at opposing sides of said first part, and said at least one spindle leaves at least one centering hole extending axially through said annular insert;

providing a second part having at least one mounting hole positioned against and aligned with a corresponding one of said at least one centering hole of said first part;

wherein said at least one centering hole comprises a first centering hole of a first one of at least one annular insert having a first radially oblong cross section, aligned with its oblong length along a first axis providing free play along said first axis, and a second centering hole, of a second one of at least one annular insert having a second radially oblong cross section, aligned with its oblong length along a second axis providing free play along said second axis, wherein said first axis is perpendicular to said second axis and said first and second axes are offset such that said first axis does not cross said second centering hole and said second axis does not cross said first centering hole;

providing at least one centering screw or a pin, said at least one centering screw or pin sized for insertion into a corresponding one of said at least one centering hole, wherein said at least one centering hole has geometry permitting free play between said centering screw or pin and corresponding said centering hole in a first direction taken normal to an axis of said centering hole; arranging said first and second parts with said at least one mounting hole and at least one centering hole positioned for rough alignment, said rough alignment in which one of said at least one centering screw or pin is insertable through one of said at least one centering hole into said corresponding one of said at least one mounting hole;

positioning said first part relative to said second part by inserting said at least one centering screw or pin though said corresponding one of said at least one centering hole into said mount hole, one of said at least one centering screw or pin operative as a centering post for alignment of said parts, said free play maintaining rough alignment while said free play permitting fine alignment between said first and second parts; and securing said first and second parts together by attachment screws.

2. The method of claim 1, wherein
in said step of providing an annular insert, said annular insert material is metal.

3. The method of claim 1 wherein
in said providing an annular insert, said annular insert comprises a slit rolled metal band.

4. The method of claim 1, wherein
in said providing a mold step, said spindle has an oblong cross section, said oblong cross section having a larger diameter axis and a traversing shorter diameter axis;
wherein in said unmolding step, said centering hole has a corresponding oblong cross section.

5. The method of claim 4, wherein
in said step of providing a mold, said at least one spindle is a plurality of spindles;
wherein in said molding step, a first portion of said oblong centering holes has a first larger diameter axis aligned perpendicularly to a larger diameter axis of a second portion of said oblong centering holes;
wherein said positioning step includes:
  beginning positioning of said first part relative to said second part by inserting one of said centering screws or pins though said oblong centering hole into said mount hole, said centering screw or pin operative as a centering post for alignment of said parts; and
  continuing positioning of the first part relative to said second part by inserting additional centering screws or pins though oblong centering holes into corresponding mount holes.

6. The method of claim 4 wherein
in said providing a mold step, said at least one spindle is at least three spindles.

7. The method of claim 3, wherein
opposing ends of said rolled metal band forms sidewalls of said slot, said slot formed by a gap between rolled ends of said metal band.

8. An assembly of at least two parts comprising:
a first part of a molded plastic creep sensitive material, said first part comprising:
at least one annular insert, comprising creep resistant material, secured in said first part, said at least one annular insert having a circumferential wall including an outer circumferential surface and an inner bore, said at least one annular insert including:
  two wall passages extending through said wall from the outer circumferential surface to the inner bore;
  wherein said two wall passages arranged on diametrically opposing sides of said circumferential wall;
  wherein said wall passages are any of:
    at least one through orifice;
    a recess formed in an end face of said annular insert;
    a slot;
  wherein said molded plastic creep sensitive material of said first part extends through said two wall passages from said outer circumferential surface into said inner bore;

a first crescent shaped plastic segment secured to inner wall of said annular insert, said first crescent shaped plastic segment extending axially within said inner bore between opposing axial ends of said annular insert;

a second crescent shaped plastic segment secured to an inner wall of said annular insert at a diametrically opposing sides of said circumferential wall relative to said first crescent shaped plastic segment, said second crescent shaped plastic segment extending axially within said inner bore between said opposing axial ends of said annular insert;

wherein said first crescent shaped plastic segment is connected to and formed by said molded plastic creep sensitive material extending through a first one of said wall passages;

wherein said second crescent shaped plastic segment is connected to and formed by said molded plastic creep sensitive material extending through a second one of said wall passages;

wherein said diametrically opposed first and second crescent shaped segments form opposing sides of at least one centering hole axially extending between said opposing axial ends of a corresponding one of said at least one annular insert, said at least one centering hole having a radially oblong cross section;

wherein said at least one annular insert extends through a corresponding one of at least one opening in said first part, having an axial length selected such that said annular insert is operable as a compression limiter;

wherein said at least one annular insert is molded with said first part and opens at opposing sides of said first part;

a second part having at least one mounting hole positioned against and aligned with the at least one centering hole of the first part;

wherein said at least one centering hole comprises:

a first centering hole of a first one of at least one annular insert having a first radially oblong cross section, aligned with its oblong length along a first axis providing free play along said first axis;

a second centering hole, of a second one of at least one annular insert having a second radially oblong cross section, aligned with its oblong length along a second axis providing free play along said second axis;

wherein said first axis is perpendicular to said second axis and said first and second centering holes are offset such that said first axis does not cross said second centering hole and said second axis does not cross said first centering hole; and at least one centering screw or pin inserted through at least one aligned centering and mounting hole, said free play providing rough alignment while permitting fine alignment between said first and second parts;

wherein the first part may be assembled to a second part according to the method of claim 1.

9. The assembly of claim 8, wherein said first part further comprises:

at least one annular insert compression limiter having a circular bore sized to receive a mounting screw therethough, said bore of a diameter larger than a diameter of said screw to provide free play between said bore and screw;

wherein said annular inserts with said oblong centering hole have an external shape and size matching said annular inserts with said circular bore.

10. The assembly of claim 8, wherein said two wall passages of said at least one annular insert are both through orifices.

11. The assembly of claim 8, wherein said wall passages of said at least one annular insert are both recesses formed in said end face of said annular insert.

* * * * *